United States Patent
Wang et al.

(10) Patent No.: US 8,421,978 B2
(45) Date of Patent: Apr. 16, 2013

(54) LIQUID CRYSTAL DISPLAY PANEL COMPRISING FIRST CONNECTING ELECTRODES DISPOSED ON A PADDING DEVICE AND ELECTRICALLY CONNECTED TO ACTIVE DEVICES AND TO SECOND CONNECTING ELECTRODES

(75) Inventors: Wen-Chun Wang, Taichung (TW); Ming-Chang Yu, Taichung (TW); Yung-Cheng Chang, Taichung (TW); Ting-Yu Chang, Kaohsiung County (TW); Wan-Jen Tsai, Taichung County (TW)

(73) Assignee: Wintek Corporation, Taichung (TW)

( * ) Notice: Subject to any disclaimer, the term of this patent is extended or adjusted under 35 U.S.C. 154(b) by 319 days.

(21) Appl. No.: 12/917,484

(22) Filed: Nov. 2, 2010

(65) Prior Publication Data
US 2011/0102698 A1    May 5, 2011

(30) Foreign Application Priority Data

Nov. 3, 2009  (TW) .............................. 98137306 A

(51) Int. Cl.
*G02F 1/1343* (2006.01)
*G02F 1/1333* (2006.01)
*G02F 1/1339* (2006.01)
*G02F 1/1335* (2006.01)

(52) U.S. Cl.
USPC ............. 349/147; 349/54; 349/157; 349/141; 349/12

(58) Field of Classification Search ................... 349/147, 349/155–157, 141, 12, 54
See application file for complete search history.

(56) References Cited

U.S. PATENT DOCUMENTS

| 8,087,965 B2* | 1/2012 | Bae et al. .......................... 445/24 |
| 2005/0253991 A1* | 11/2005 | Chang ............................ 349/147 |
| 2007/0195029 A1* | 8/2007 | Jeon et al. ....................... 345/87 |
| 2010/0141880 A1* | 6/2010 | Koito et al. ..................... 349/123 |
| 2011/0291094 A1* | 12/2011 | Cheng et al. ..................... 257/59 |

* cited by examiner

*Primary Examiner* — Edward Glick
*Assistant Examiner* — Dennis Y Kim
(74) *Attorney, Agent, or Firm* — Jianq Chyun IP Office

(57) ABSTRACT

A liquid crystal display panel including an active device matrix substrate, an opposite substrate, and a liquid crystal layer is provided. The active device matrix substrate includes a first substrate, an active device array, a padding device, first connecting electrodes, and shielding electrodes. The padding device is disposed on active devices and data lines of the active device array. The first connecting electrodes are located above the active devices and electrically connected to the active devices. The shielding electrodes are located above the data lines and electrically connected to a common voltage. The opposite substrate includes a second substrate, first electrodes, an insulating layer, second electrodes having slits and opposite to the first electrodes, spacers corresponding to the active devices, and second connecting electrodes covering the spacers to directly contact with the first connecting electrodes and electrically connected to the first electrodes or the second electrodes.

17 Claims, 4 Drawing Sheets

LIQUID CRYSTAL DISPLAY PANEL COMPRISING FIRST CONNECTING ELECTRODES DISPOSED ON A PADDING DEVICE AND ELECTRICALLY CONNECTED TO ACTIVE DEVICES AND TO SECOND CONNECTING ELECTRODES

CROSS-REFERENCE TO RELATED APPLICATION

This application claims the priority benefit of Taiwan application serial no. 98137306, filed on Nov. 3, 2009. The entirety of the above-mentioned patent application is hereby incorporated by reference herein and made a part of this specification.

BACKGROUND OF THE INVENTION

1. Field of the Invention

The invention relates to a display panel and more particularly to a liquid crystal display panel.

2. Description of Related Art

In general, liquid crystal displays (LCDs) are mainly constituted by two substrates and a liquid crystal layer disposed therebetween, where a plurality of pixel structures is disposed on one of the substrates to control the arrangement of liquid crystal molecules for display. The pixel structures include a plurality of scanning lines, a plurality of data lines, a plurality of active devices, and a plurality of pixel electrodes. The pixel electrodes are located in the pixel regions intersected by the scanning lines and the data lines.

To increase a display aperture ratio of display panels, areas of the pixel electrodes are increased as much as possible. However, when a distance between the pixel electrodes and the data lines becomes too short, a fringe field between the data lines and the pixel electrodes then influences the tilting of liquid crystal molecules to result in bright/dark state light leakage, thereby affecting the display quality of LCD panels.

SUMMARY OF THE INVENTION

The invention is directed to a liquid crystal display (LCD) panel having high contrast and superior display quality.

The invention is directed to a liquid crystal display panel including an active device matrix substrate, an opposite substrate, and a liquid crystal layer. The active device matrix substrate includes a first substrate, an active device array, a padding device, a plurality of first connecting electrodes, and a plurality of shielding electrodes. The active device array is disposed on the first substrate and includes a plurality of scanning lines, a plurality of data lines, and a plurality of active devices. The scanning lines and the data lines intersect to define a plurality of pixel regions. The active devices are electrically connected to the corresponding scanning lines and data lines. The padding device is disposed on the active devices and the data lines. The first connecting electrodes are disposed on the padding device, located above the active devices, and electrically connected to the active devices. The shielding electrodes are disposed on the padding device, located above the data lines, and electrically connected to a common voltage. The opposite substrate is located above the active device matrix substrate. The opposite substrate includes a second substrate, a plurality of first electrodes, an insulation layer, a plurality of second electrodes, a plurality of spacers, and a plurality of second connecting electrodes. The first electrodes are disposed on the second substrate corresponding to the pixel regions. The insulation layer is disposed on the first electrodes. The second electrodes are disposed on the insulation layer corresponding to the first electrodes, where the second electrodes have a plurality of slits. The spacers are disposed on the insulation layer and correspond to the active devices respectively. The second connecting electrodes cover the spacers and contact the first connecting electrodes directly. The second connecting electrodes are electrically connected to the first electrodes or the second electrodes. The liquid crystal layer is disposed between the active device matrix substrate and the opposite substrate.

In light of the foregoing, in the invention, the first electrodes and the second electrodes for displaying images are disposed on the opposite substrate, and the shielding electrodes electrically connected to the common voltage are disposed above the data lines on the active device matrix substrate. When a liquid crystal display (LCD) panel of the invention displays, the shielding electrodes provide a shield to prevent signals transmitted by the data lines from interfering voltages in the first electrodes and the second electrodes for displaying images. Thus, the conventional dark state light leakage is improved. In addition, disposition areas of the first electrodes and the second electrodes can be suitably expanded to the top of the data lines so as to increase a display aperture ratio. In other words, the LCD panel of the invention has high contrast and superior display quality.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
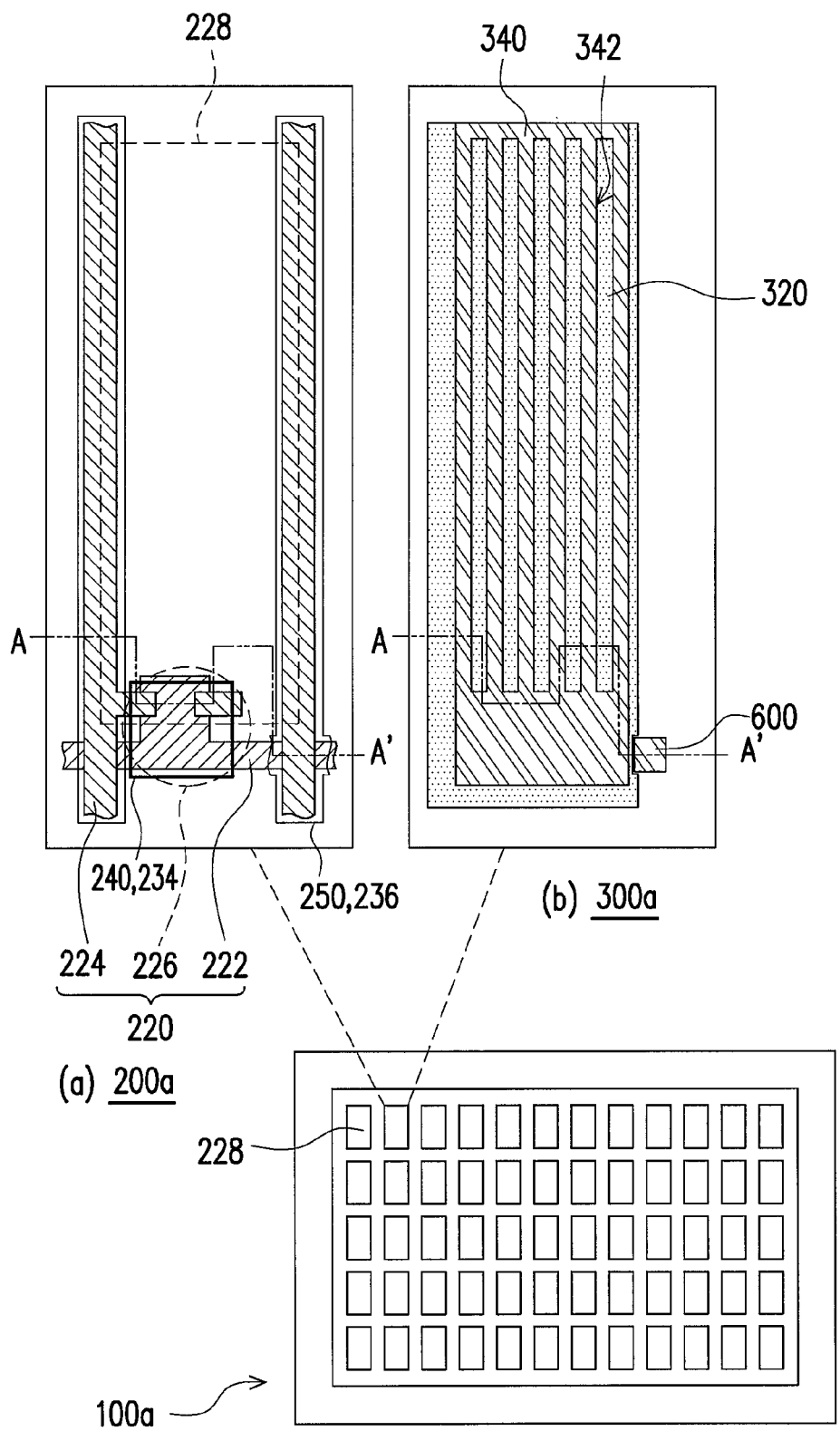
FIG. 1 is a schematic top view of a liquid crystal display (LCD) panel according to an embodiment of the invention, wherein a sub-diagram (a) illustrates a partial schematic top view of an active device matrix substrate and a sub-diagram (b) illustrates a partial schematic top view of an opposite substrate.
Figure 2:
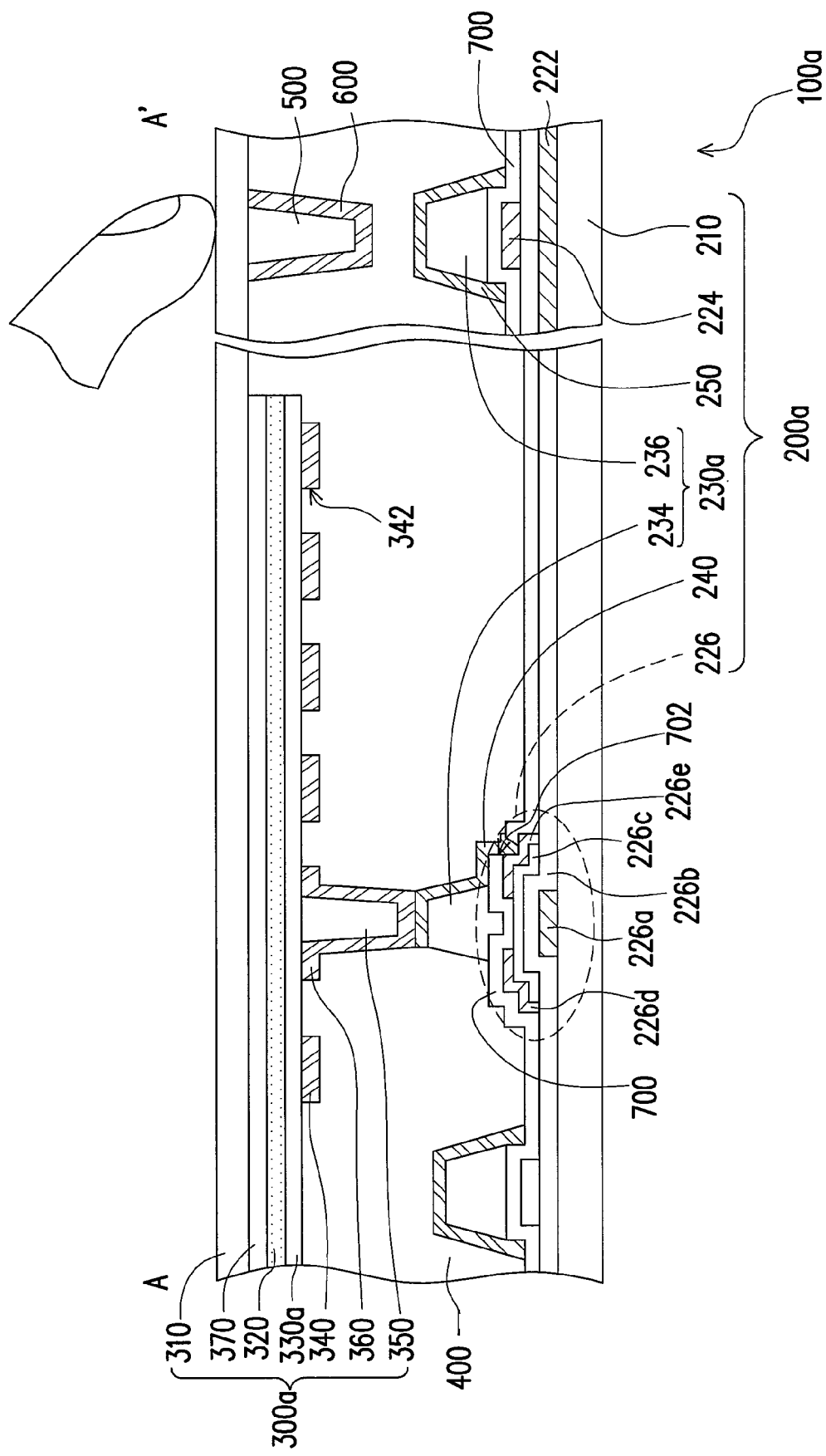
FIG. 2 is a partial schematic cross-sectional view of the LCD panel taken along line A-A' in FIG. 1.

FIG. 1 is a schematic top view of a liquid crystal display (LCD) panel according to an embodiment of the invention. A sub-diagram (a) illustrates a partial schematic top view of an active device matrix substrate. A sub-diagram (b) illustrates a partial schematic top view of an opposite substrate. FIG. 2 is a partial schematic cross-sectional view of the LCD panel taken along line A-A' in FIG. 1. Referring to FIGS. 1 and 2 simultaneously, in the present embodiment, an LCD panel 100a includes an active device matrix substrate 200a, an opposite substrate 300a, and a liquid crystal layer 400. The opposite substrate 300a is located above the active device matrix substrate 200a. The liquid crystal layer 400 is disposed between the active device matrix substrate 200a and the opposite substrate 300a.

The active device matrix substrate 200a includes a first substrate 210, an active device array 220, a padding device 230a, a plurality of first connecting electrodes 240, and a plurality of shielding electrodes 250. The active device array 220 is disposed on the first substrate 210 and includes a plurality of scanning lines 222, a plurality of data lines 224, and a plurality of active devices 226. The scanning lines 222 and the data lines 224 intersect to define a plurality of pixel regions 228. The active devices 226 are electrically connected to the corresponding scanning lines 222 and data lines 224.

The padding device 230a is disposed on the active devices 226 and the data lines 224. In details, in the present embodiment, the padding device 230a includes a plurality of first padding patterns 234 and a plurality of second padding patterns 236. The first padding patterns 234 are disposed on the active devices 226 and the second padding patterns 236 are disposed on the data lines 224. In the present embodiment, the first padding patterns 234 and the second padding patterns 236 are, for examples, in the same layer. That is, the first padding patterns 234 and the second padding patterns 236 can be fabricated simultaneously by the same fabrication process. Specifically, the first padding patterns 234 are substantially covered by the first connecting electrodes 240 so that the first padding patterns 234 are not shown in the top view of FIG. 1. Similarly, the second padding patterns 236 are cover by the shielding electrodes 250 and are omitted in the top view of FIG. 1.

The first connecting electrodes 240 are disposed on the first padding patterns 234, located above the active devices 226, and electrically connected to the active devices 226. The shielding electrodes 250 are disposed on the second padding patterns 236, located above the data lines 224, and electrically connected to a common voltage. Particularly, the first connecting electrodes 240 and the shielding electrodes 250 in the present embodiment are in the same layer. That is, the first connecting electrodes 240 and the shielding electrodes 250 are fabricated simultaneously by the same fabrication process. Moreover, the first connecting electrodes 240 are fabricated using indium tin oxide (ITO), for example. The shielding electrodes 250 are fabricated using ITO or other transparent conductive materials, for example.

Specifically, each of the active devices 226 is constituted by a gate 226a, a gate insulating layer 226b, a semiconductor layer 226c, a source 226d, and a drain 226e. The gate 226a is disposed on the first substrate 210 and electrically connected to the scanning line 222. The gate insulating layer 226b covers the gate 226a and a portion of the first substrate 210. The semiconductor layer 226c is disposed on the gate insulating layer 226b. The source 226d and the drain 226e are disposed on the semiconductor layer 226c. The source 226d is electrically connected to the data line 224. In the present embodiment, the first connecting electrode 240 is electrically connected to the drain 226e of the active device 226.

Additionally, the LCD panel 100a of the present embodiment further includes a passivation layer 700 on an active device matrix substrate 200a. Here, the passivation layer 700 covers on the active device 226 and the data line 224. The passivation layer 700 is located between the active device 226 and the first padding pattern 234 and between the data line 224 and the second padding pattern 236 to protect the active device 226 and the data line 224. The passivation layer 700 is fabricated with dielectric materials, for instance, silicon dioxide, silicon nitride, or silicon oxynitride. It should be noted that the passivation layer 700, for example, has a contact window 702 exposing the drain 226e, so that the first connecting electrode 240 is electrically connected to the drain 226e.

The opposite substrate 300a includes a second substrate 310, a plurality of first electrodes 320, an insulation layer 330a, a plurality of second electrodes 340, a plurality of spacers 350, and a plurality of second connecting electrodes 360. In addition, the LCD panel 100a further includes at least one sensing spacer 500 and at least one sensing electrode 600 disposed on the second substrate 310. The first electrodes 320 are disposed on the second substrate 310 corresponding to the pixel regions 228. The insulation layer 330a is disposed on the first electrodes 320. The second electrodes 340 are disposed on the insulation layer 330a corresponding to the first electrodes 320, where the second electrodes 340 have a plurality of slits 342. The spacers 350 are disposed on the insulation layer 330a and correspond to the active devices 226 respectively. The second connecting electrodes 360 cover the spacers 350 and contact the first connecting electrodes 240 directly. The second connecting electrodes 360 are electrically connected to the first electrodes 320 or the second electrodes 340. In particular, the second connecting electrode 360 is electrically connected to the second electrode 340 directly, and the first electrode 320 is connected to the common voltage in the present embodiment.

In the present embodiment, the second electrodes 340 and the second connecting electrodes 360 are, for instance, in the same layer. In other words, the second electrodes 340 and the second connecting electrodes 360 are fabricated simultaneously by the same fabrication process. Practically, the second connecting electrode 360 can be a portion of the second electrode 340. That is, the second connecting electrode 360 and the second electrode 340 are constituted by the same electrode pattern. The opposite substrate 300a is, for example, a color filter layer substrate. That is to say, the opposite substrate 300 further includes a color filter layer 370. Herein, the color filter layer 370 is disposed between the second substrate 310 and the first electrode 320. Obviously, in other embodiments not illustrated herein, the opposite substrate 300a can also be a transparent substrate and the color filter layer 370 is, for example, disposed on the first substrate 210.

In the present embodiment, the first electrodes 320 and the second electrodes 340 for displaying images are disposed on the opposite substrate 300a, and the shielding electrodes 250 electrically connected to the common voltage are disposed above the data lines 224 on the active device matrix substrate 200a. Consequently, voltage signals of the first electrodes 320 and the second electrodes 340 are not easily affected by the data lines 224. Accordingly, disposition areas of the first electrodes 320 and the second electrodes 340 can be suitably expanded to the top of the data lines 224 so as to increase a display aperture ratio. In short, the LCD panel 100a of the present embodiment has high contrast and superior display quality. When the LCD panel 100a displays, the shielding electrodes 250 provide a shield effect to prevent signals transmitted by the data lines 224 from interfering voltages in the first electrodes 320 and the second electrodes 340 for displaying images. The design of the LCD panel 100a in the present embodiment thus improves the conventional dark state light leakage.

Moreover, the first electrodes 320, the insulation layer 330a, and the second electrodes 340 expose a portion of the second substrate 310 as shown in the right side portion of FIG. 2. The at least one sensing spacer 500 and the at least one sensing electrode 600 are disposed on the exposed portion of the second substrate 310. Here, the sensing spacer 500 is disposed on the exposed portion of the second substrate 310 and located above the data lines 224. The sensing electrode 600 covers the sensing spacer 500. Additionally, the sensing spacer 500 and the spacers 350 are in the same layer. That is, the sensing spacer 500 and the spacers 350 are fabricated using the same fabrication process. The sensing electrode 600 and the second electrode 340 are simultaneously formed and are in the same layer. The sensing electrode 600 can be selectively electrically connected to one of the first electrode 320 and the second electrode 340 so as to receive a common voltage. In the present embodiment, the second electrode 340 is electrically connected to the active device 226 and the first electrode 320 is served as a common electrode. Accordingly, the sensing electrode 600 is electrically connected to the first electrode 320 in the present embodiment. In an alternate embodiment, when the second electrode 340 is served as a common electrode and the first electrode 320 is electrically connected to the active device 226, the sensing electrode 600 is, thus, electrically connected to the second electrode 340.

More particularly, in the present embodiment, a width of a portion of the second padding patterns 236 corresponding to, i.e. opposite to, the sensing spacer 500 is larger than a width of other portions of the second padding patterns 236 as shown in the sub-diagram (a) of FIG. 1. In other words, a portion of the second padding patterns 236 above the data lines 224 and opposite to the sensing spacer 500 has a larger width. The sensing electrode 600 is fabricated by using ITO, for instance.

In the present embodiment, the sensing spacer 500 is disposed on the second substrate 310 directly. Consequently, the sensing spacer 500 in the LCD panel 100a and the second padding patterns 236 above the data lines 224 have a distance therebetween. When a user touches the LCD panel 100a, the opposite substrate 300a is bent due to an external force, such that the sensing electrode 600 on the sensing spacer 500 directly contacts with the corresponding shielding electrode 250 to result in short circuit. At this time, a potential of the sensing electrode 600 is transmitted to the shielding electrode 250, and a chip (not shown) connected to the shielding electrode 250 calculates coordinates of a point touched by the user from the potential received by the shielding electrode 250. The LCD panel 100a of the present embodiment also includes a touch sensing function.

Since the portion of the second padding patterns 236 opposite to the sensing spacer 500 has a larger width as shown in the sub-diagram (a) of FIG. 1, when the user touches the LCD panel 100a, the conductance of the sensing electrode 600 on the sensing spacer 500 and the corresponding shielding electrode 250 on the second padding patterns 236 is further ensured to increase a yield of the LCD panel 100a.

Figure 3:
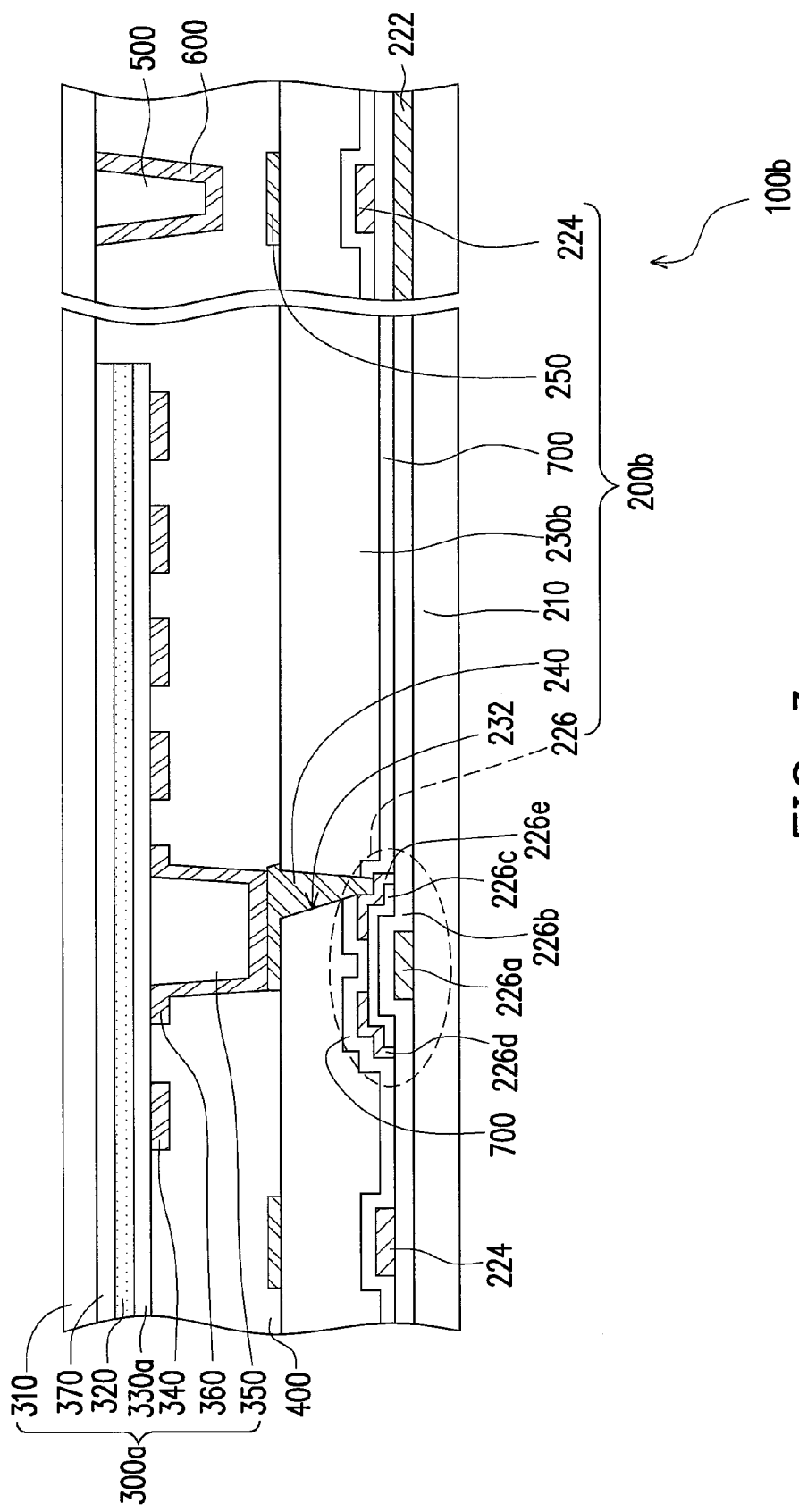
FIG. 3 shows a schematic cross-sectional view of an LCD panel according to another embodiment of the invention.

It should be noted that the external structure design of the padding device 230a can have other variations. For example, referring to FIG. 3, an LCD panel 100b in FIG. 3 is similar to the LCD panel 100a in FIG. 2. The difference between the LCD panel 100b and the LCD panel 100a lies in that a padding device 230b of FIG. 3 is a continuous padding layer and has a plurality of contact openings 232. The first connecting electrodes 240 are electrically connected to the active devices 226 through the contact openings 232.

Figure 4:
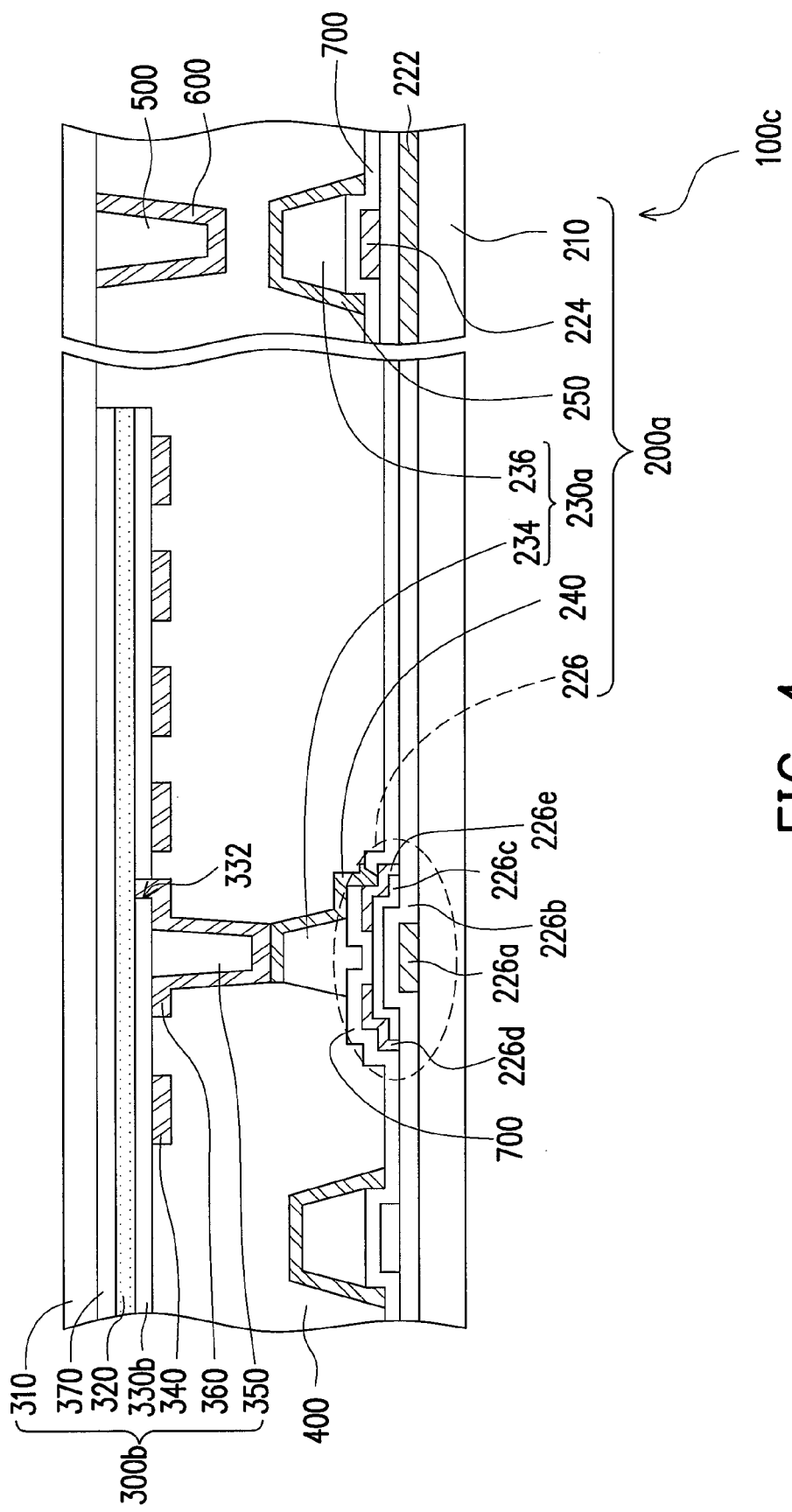
FIG. 4 shows a schematic cross-sectional view of an LCD panel according to another embodiment of the invention.

Furthermore, a structural design of the insulation layer 330a on the opposite substrate 300a and an electrical property relationship among the first electrodes 320, the second electrodes 340, and the second connecting electrodes 360 can have other variations. For instance, referring to FIG. 4, an LCD panel 100c in FIG. 2 is similar to the LCD panel 100a in FIG. 2. The difference between the two lies in that an insulation layer 330b has a contact window 332 exposing the first electrodes 320, and the second connecting electrodes 360 is electrically connected to the first electrodes 320 through the contact window 332. Here, the second electrodes 340 are connected to the common voltage, for example. Practically, one of the first electrode 320 and the second electrode 340 is connected to the common voltage, and another of the first electrode 320 and the second electrode 340 is connected to the drain 226e of the active device 226 to obtain a wide viewing angle display effect of a fringe field switch (FFS) type.

In summary, in the invention, the electrodes connected to the active devices on the active device matrix substrate and the electrodes connected to the common voltage are disposed on the opposite substrate, and the shielding electrodes are disposed above the data lines on the active device matrix substrate. Thus, during display, the electrodes on the opposite substrate receive different voltages respectively to generate a fringe electric field effect, so that the LCD panel represents a wide viewing angle display effect. Also, the shielding electrodes above the data lines have a shielding effect to prevent the conventional dark state light leakage. In other words, the LCD panel of the invention has high contrast and superior display quality. The LCD panel of the invention includes a device design of touch function. When the user touches the LCD panel, since the width of a portion of the padding patterns opposite to the spacers is larger than the width of other portions, the conductance of the sensing electrode on the sensing spacer and the shielding electrodes on the corresponding padding patterns is further ensured to increase the yield rate of the LCD panels.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A liquid crystal display panel, comprising:
an active device matrix substrate, comprising:
a first substrate;
an active device array, disposed on the first substrate and comprising a plurality of scanning lines, a plurality of data lines, and a plurality of active devices, wherein the scanning lines and the data lines intersect to define a plurality of pixel regions, and the active devices are electrically connected to the corresponding scanning lines and the corresponding data lines;
a padding device, disposed on the active devices and the data lines;
a plurality of first connecting electrodes, disposed on the padding device, located above the active devices, and electrically connected to the active devices;
a plurality of shielding electrodes, disposed on the padding device, located above the data lines, and electrically connected to a common voltage;
an opposite substrate, located above the active device matrix substrate, the opposite substrate comprising:
a second substrate;
a plurality of first electrodes, disposed on the second substrate corresponding to the pixel regions;
an insulation layer, disposed on the first electrodes;
a plurality of second electrodes, disposed on the insulation layer corresponding to the first electrodes, wherein the second electrodes have a plurality of slits;
a plurality of spacers, disposed on the insulation layer and corresponding to the active devices respectively;
a plurality of second connecting electrodes, covering the spacers and contacted with the first connecting electrodes directly, wherein the second connecting electrodes are electrically connected to the first electrodes or the second electrodes; and a liquid crystal layer, disposed between the active device matrix substrate and the opposite substrate.

2. The liquid crystal display panel as claimed in claim 1, wherein the first connecting electrodes and the shielding electrodes are in a same layer.

3. The liquid crystal display panel as claimed in claim 1, wherein the second electrodes and the second connecting electrodes are in a same layer.

4. The liquid crystal display panel as claimed in claim 1, wherein the second connecting electrodes are connected to the second electrodes directly, and the first electrodes are connected to the common voltage.

5. The liquid crystal display panel as claimed in claim 1, wherein the insulation layer has a contact window exposing the first electrodes, the second connecting electrodes are electrically connected to the first electrodes through the contact window, and the second electrodes are connected to the common voltage.

6. The liquid crystal display panel as claimed in claim 1, further comprising at least one sensing spacer and at least one sensing electrode, disposed on the second substrate and located above the data lines, wherein the at least one sensing electrode covers the at least one sensing spacer.

7. The liquid crystal display panel as claimed in claim 6, wherein the first electrodes, the insulation layer, and the second electrodes expose a portion of the second substrate and the at least one sensing spacer is disposed on the exposed portion of the second substrate.

8. The liquid crystal display panel as claimed in claim 7, wherein the at least one sensing spacer and the spacers are in a same layer.

9. The liquid crystal display panel as claimed in claim 1, wherein the padding device is a continuous padding layer having a plurality of contact openings, and the first connecting electrodes are electrically connected to the active devices through the contact openings.

10. The liquid crystal display panel as claimed in claim 1, wherein the padding device comprises a plurality of first padding patterns and a plurality of second padding patterns, the first padding patterns are disposed on the active devices and the second padding patterns are disposed on the data lines.

11. The liquid crystal display panel as claimed in claim 10, wherein the first padding patterns and the second padding patterns are in a same layer.

12. The liquid crystal display panel as claimed in claim 10, further comprising at least one sensing spacer and at least one sensing electrode, disposed on the second substrate and located above the data lines, wherein the at least one sensing electrode covers the at least one sensing spacer.

13. The liquid crystal display panel as claimed in claim 12, wherein the first electrodes, the insulation layer, and the second electrodes expose a portion of the second substrate and the at least one sensing spacer is disposed on the exposed portion of the second substrate.

14. The liquid crystal display panel as claimed in claim 13, wherein the at least one sensing spacer and the spacers are in a same layer.

15. The liquid crystal display panel as claimed in claim 13, wherein a width of a portion of the second padding patterns corresponding to the at least one sensing spacer is larger than a width of other portions.

16. The liquid crystal display panel as claimed in claim 1, further comprising a passivation layer covering on the active devices and the data lines, and located between the active devices and the padding device and between the data lines and the padding device.

17. The liquid crystal display panel as claimed in claim 1, wherein the opposite substrate further comprises a filtering layer disposed between the second substrate and the first electrodes.

* * * * *